US011525451B2

(12) United States Patent
Karstadt (10) Patent No.: US 11,525,451 B2
(45) Date of Patent: Dec. 13, 2022

(54) COMPRESSOR INLET ADJUSTMENT MECHANISM

(71) Applicant: BorgWarner Inc., Auburn Hills, MI (US)

(72) Inventor: Sascha Karstadt, Undenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/967,484

(22) PCT Filed: Feb. 22, 2019

(86) PCT No.: PCT/US2019/019163
§ 371 (c)(1),
(2) Date: Aug. 5, 2020

(87) PCT Pub. No.: WO2019/168754
PCT Pub. Date: Sep. 6, 2019

(65) Prior Publication Data
US 2021/0115942 A1    Apr. 22, 2021

(30) Foreign Application Priority Data
Feb. 27, 2018  (EP) ..................................... 18158879

(51) Int. Cl.
*F04D 27/02*   (2006.01)
*F04D 29/42*   (2006.01)
(Continued)

(52) U.S. Cl.
CPC ............ *F04D 27/0253* (2013.01); *F02C 6/12* (2013.01); *F02C 7/042* (2013.01);
(Continued)

(58) Field of Classification Search
CPC ............. F04D 29/4213; F04D 15/0022; F04D 29/464; F04D 27/0253; F05D 2250/51; F05D 2270/101
See application file for complete search history.

(56) References Cited

U.S. PATENT DOCUMENTS 4,122,668 A * 10/1978 Chou .................... F01D 21/006
188/290
6,099,168 A     8/2000 Sishtla
(Continued)

FOREIGN PATENT DOCUMENTS

CN    102713304 A    10/2012
CN    209340138 U     9/2019
(Continued)

OTHER PUBLICATIONS

International Search Report of the International Searching Authority for PCT/US2019/019163 dated May 21, 2019.
(Continued)

*Primary Examiner* — Igor Kershteyn
*Assistant Examiner* — Brian Christopher Delrue
(74) *Attorney, Agent, or Firm* — Howard & Howard Attorneys PLLC (57) ABSTRACT

The present invention relates to an adjustment mechanism (100) for variably adjusting the cross-section of a compressor inlet (22) and further relates to a corresponding compressor (20) including such an adjustment mechanism (100). The adjustment mechanism (100) comprises a plurality of rotatable orifice elements (110) and an actuation ring (120). The actuation ring (120) is mechanically coupled to the plurality of orifice elements 110 such that rotation of the actuation ring 120 causes movement of the orifice elements 110. The movement of the orifice elements (110) thereby adjusts the cross-section of a compressor inlet (22). The adjustment mechanism (100) further comprises a plurality of
(Continued)

support members (140) which are arranged axially between the plurality of orifice elements (110) and the actuation ring (120). Additionally, the adjustment mechanism (100) comprises a spring (130), more specific a ring-shaped wave spring. The spring (130) is adapted to axially preload the plurality of orifice elements (110) and the actuation ring (120) when being in a mounted state.

16 Claims, 4 Drawing Sheets

(51) Int. Cl.
  *F04D 29/46* (2006.01)
  *F02C 6/12* (2006.01)
  *F02C 7/042* (2006.01)
(52) U.S. Cl.
  CPC ....... *F04D 29/4213* (2013.01); *F04D 29/464* (2013.01); *F05D 2250/51* (2013.01); *F05D 2270/101* (2013.01)

(56) References Cited

U.S. PATENT DOCUMENTS

| | | | |
|---|---|---|---|
| 9,200,640 B2 | 12/2015 | Patil | |
| 10,299,642 B2* | 5/2019 | Buchanan | F04D 27/003 |
| 10,465,706 B2* | 11/2019 | Lombard | F02B 37/00 |
| 10,495,100 B2* | 12/2019 | Mohtar | F04D 29/464 |
| 10,502,232 B2* | 12/2019 | Mohtar | F02C 6/12 |
| 10,544,808 B2* | 1/2020 | Mohtar | F16K 3/03 |
| 10,570,905 B2* | 2/2020 | Mohtar | F04D 29/685 |
| 10,619,561 B2* | 4/2020 | Lombard | F04D 29/464 |
| 2011/0194904 A1* | 8/2011 | Carlson | F04D 27/0246 406/12 |
| 2015/0041695 A1* | 2/2015 | Daniels | F16K 31/53 251/212 |
| 2016/0146099 A1* | 5/2016 | Mohtar | F04D 25/024 415/160 |
| 2019/0078586 A1* | 3/2019 | Zeng | F04D 27/0215 |
| 2020/0208651 A1* | 7/2020 | Bogner | F04D 17/10 |
| 2020/0291852 A1* | 9/2020 | Karstadt | F04D 29/4213 |
| 2021/0115942 A1 | 4/2021 | Karstadt | |
| 2021/0190091 A1* | 6/2021 | Karstadt | F04D 29/083 |

FOREIGN PATENT DOCUMENTS

| | | |
|---|---|---|
| DE | 10 2013 003418 A1 | 8/2014 |
| DE | 10 2017 118794 A1 | 2/2019 |
| WO | 2018/106620 A1 | 6/2018 |

OTHER PUBLICATIONS

English language abstract for CN 102713304 A extracted from espacenet.com database on Jun. 27, 2022, 2 pages.
English language abstract for CN 209340138 U extracted from espacenet.com database on Jun. 27, 2022, 2 pages.

* cited by examiner

COMPRESSOR INLET ADJUSTMENT MECHANISM

CROSS-REFERENCE TO RELATED APPLICATIONS

The present application is the National Stage of International Patent Application No. PCT/US2019/019163 filed on Feb. 22, 2019, which claims priority to and all the benefits of European Patent Application No. 18158879.9 filed on Feb. 27, 2018, which are hereby expressly incorporated herein by reference in their entirety.

TECHNICAL FIELD

This disclosure relates to an adjustment mechanism for adjusting the cross-section of a compressor inlet. Furthermore, the invention relates to a compressor having such an adjustment mechanism.

BACKGROUND

The individual mobility sector is experiencing a disruptive change. Especially, the increasing number of electric vehicles entering the market demands higher efficiencies from traditional internal combustion engine (ICE) vehicles. Therefore, more and more vehicles are equipped with efficiency increasing measures, such as charging devices or lightweight design. Well known are, for instance, charging devices wherein a compressor, which may be driven by an e-motor or an exhaust gas powered turbine, provides compressed air to the ICE. This leads to a performance enhancement of the ICE.

Common compressors thereby comprise a compressor housing and a compressor wheel which is arranged in the housing. In operation, air is sucked through a compressor inlet of the housing to get accelerated by the compressor wheel and then exits the compressor via a volute of the compressor housing. Each compressor has its characterizing compressor map defining its operating range. This operating range is mainly bound by the surge line and the choke line in the compressor map.

To further improve the efficiency of the ICE, it is well known to enhance the compressor map, e.g. by preventing surging, i.e. by taking measures to move the surge line to the left. This can be done, for example, by compressor inlet adjustment mechanisms. Common adjustment mechanisms are configured, for instance, to increase the speed of the air flow, to modify the flow angle or to establish a flow path recirculation. These measures typically require space, may increase the weight and may increase the need for maintenance due to wear.

Accordingly, the objective of the present invention is to increase the efficiency of a compressor.

SUMMARY

The present invention relates to an adjustment mechanism as set out in claims 1 and 2, and a corresponding compressor including such an adjustment mechanism as set out in claim 14. Other embodiments are described in the dependent claims.

According to a 1st embodiment, the inventive adjustment mechanism for variably adjusting the cross-section of a compressor inlet comprises a plurality of rotatable orifice elements and an actuation ring. The actuation ring is mechanically coupled to the plurality of orifice elements such that rotation of the actuation ring causes movement of the orifice elements. The movement of the orifice elements thereby adjusts the cross-section of a compressor inlet. The adjustment mechanism further comprises a plurality of support members which are arranged axially between the plurality of orifice elements and the actuation ring.

By adjusting the cross-section of a compressor inlet, the possibility of adapting the cross-section according to different operating conditions is established. This may lead to an enhanced compressor map as the surge line is moved to the left, i.e. towards smaller flow rates. Furthermore, the arrangement of support members axially between the plurality of orifice elements and the actuation ring establishes the option of mounting the plurality of orifice elements and the actuation ring axially against each other via contacts through said support members. This may lead to several advantageous effects, such as less unwanted movement, especially axial movement, of the plurality of orifice elements and the actuation ring and less unwanted relative movement, especially axial movement, between each other. During operation in a mounted state in a compressor housing this may advantageously result in less vibration, and thereby in less wear and noise development. Additionally, dimensions of the actuation ring, especially the outer diameter of the actuation ring, can be reduced compared to an actuation ring of an adjustment mechanism without such inventive support members. That is because the need for mounting the actuation ring in a radial outer region of a compressor housing can be omitted due to the possibility of mounting the actuation ring against the plurality of orifice elements. In turn this may lead to a size reduced compressor housing and a lighter design, in total improving the efficiency of the compressor and that of the ICE, respectively. Also, wear between the orifice elements and the actuation ring may be reduced in comparison to an adjustment mechanism without said inventive support members. That may be accomplished by the orifice elements and the actuation ring being axially in contact with each other only via the support members and not via their full surfaces facing each other.

In a second embodiment of the inventive adjustment mechanism for variably adjusting the cross-section of a compressor inlet, the adjustment mechanism comprises a plurality of rotatable orifice elements and an actuation ring. The actuation ring is mechanically coupled to the plurality of orifice elements such that rotation of the actuation ring causes movement of the orifice elements. The movement of the orifice elements thereby adjusts the cross-section of a compressor inlet. The adjustment mechanism of this second embodiment further comprises one or more springs, preferably a ring-shaped wave spring. The one or more springs are adapted to axially preload the plurality of orifice elements and/or the actuation ring in a mounted state in a compressor housing.

This advantageous embodiment may reduce unwanted movement of the plurality of orifice elements and/or the actuation ring, whilst still allowing the adjustment mechanism to be actuated. That is because the axial preload exerted on the plurality of orifice elements and/or the actuation ring mainly acts in an axial direction, whereas a rotation of the actuation ring and a corresponding movement of the orifice elements is still ensured. Thereby, especially rattle noise of the orifice elements may be reduced. In total, during operation when mounted in a compressor housing, this advantageously may lead to less noise, vibration and harshness (NVH) of the adjustment mechanism.

Furthermore, implementing an inventive spring may ensure a close contact axially between the adjustment mechanism, especially the orifice elements, and a compressor housing when mounted in that compressor housing. This may help to seal said axial area between the adjustment mechanism and the compressor housing and consequently may help to avoid pollution in the actuation mechanism. In total, this may result in higher efficiencies of the system.

In a preferred embodiment, the spring may be a ring-shaped wave spring. Alternatives to a ring-shaped wave spring, such as a plurality of coil springs, a single coil spring or similar mechanisms which exert an axial preload on the plurality of orifice elements and/or the actuation ring may be used. If a plurality of coil springs is used, they may, for instance, be distributed circumferentially on the actuation ring and arranged axially between the actuation ring and the orifice elements.

In another aspect, the adjustment mechanism of the second embodiment may further comprise a plurality of support members arranged axially between the plurality of orifice elements and the actuation ring.

The following aspects may be applicable to all previously presented embodiments and aspects.

In another aspect, which is combinable with any one of the previous aspects, the one or more springs may be arranged axially between the plurality of orifice elements and the actuation ring. Additionally or alternatively, the one or more springs may be arranged axially between the actuation ring and a surface of a compressor housing to apply an axial force via the actuation ring on the plurality of orifice elements. Alternatively, the one or more springs may be arranged axially between the plurality of orifice elements and a surface of a compressor housing.

In another aspect, which is combinable with any one of the previous aspects, the one or more springs may be adapted to ensure that at least a first axial gap between the orifice elements and a compressor housing axially opposite of the one or more springs may be minimized in a mounted state. This may be accomplished by, for instance, accurately setting the spring force of the spring and/or setting the preload which is exerted by the spring on the orifice elements. Setting the preload may also depend on the counter bearing of the spring, which may, for instance, be a compressor housing as set forth above. Furthermore, this advantageous aspect may result in an avoidance of vibration. Additionally, this aspect may prevent, i.e. substantially prevent, particles to enter and pollute the adjustment mechanism from a compressor inlet side, whilst allowing for thermal expansion and movability of movable parts, especially orifice elements and actuation ring. This, again, may result in a less error-prone adjustment-mechanism and may enhance the efficiency of a compressor using such an adjustment mechanism.

In another aspect, which is combinable with any one of the previous aspects, the support members may be configured to axially support the actuation ring against the plurality of orifice elements. By axially supporting the actuation ring against the plurality of orifice elements, the actuation ring and the orifice elements axially contact each other only via said support members. As set forth above, this advantageously may lead to less vibration, wear and noise development. At least, it may prevent a full contact between the orifice elements and the actuation ring which significantly reduces an amount of contactable surface area between the orifice elements and the actuation ring and thereby leads to a reduced friction area between these two elements. With full contact is meant that the orifice elements and the actuation ring may be axially in contact with each other via their respective surfaces (whole surface areas) facing each other. This may be prevented by the support members as the orifice elements and the actuation ring are axially in contact with each other only via the support members, thus a reduced contact area.

In another aspect, which is combinable with any one of the previous aspects, the support members may be attached to the actuation ring. Thereby, the support members may alternatively be integrally formed with the actuation ring. Additionally or alternatively, the support members may be attached to the orifice elements. Thereby, the support members may alternatively be integrally formed with the orifice elements. Another possible configuration may be that at least one of the support members is attached to the actuation ring and the rest of the support members is attached to the orifice elements or vice versa. It is self-explanatory that, regarding the latter explanations, the support members may also be integrally formed with the respective parts (actuation ring and orifice elements, respectively) instead of only being attached to them. In alternative embodiments, wherein the support members are neither attached to nor integrally formed with either the actuation ring or the orifice elements, the support members may act as separate parts axially between and interact with the actuation ring and the orifice elements. In the latter alternative embodiment, the actuation ring and the orifice elements may be correspondingly configured to mechanically interact with the support members, for instance, by each comprising recesses with which the support members may interact.

In another aspect, which is combinable with any one of the previous aspects, each of the orifice elements may comprise a coupling element extending from the respective orifice element in an axial direction towards the actuation ring. The coupling elements may be configured to mechanically couple with corresponding recesses in the actuation ring. These recesses may be configured as through holes. Alternatively, the recesses may be configured as cavities. Additionally, the support members may be arranged on the respective coupling elements to axially support the actuation ring against the plurality of orifice elements in an area of the cavity. Additionally, the support members may be integrally formed with the respective coupling elements to axially support the actuation ring against the plurality of orifice elements in an area of the cavity. In an alternative configuration, the support members may be arranged in the cavities. In a second alternative configuration of an inventive adjustment mechanism with coupling elements, the coupling elements may be part of the actuation ring and may be configured to mechanically couple with corresponding recesses in the orifice elements. That means the coupling elements may extend from the actuation ring in an axial direction towards the respective orifice elements. Each orifice element may therefore comprise a respective recess or cavity. The number of coupling elements may thereby coincide with the number of orifice elements such that each coupling element may mechanically couple with one specific orifice element. Further features, for instance, the arrangement of the support members, can be applied analogously to this second alternative configuration of the inventive adjustment mechanism with coupling elements.

In another aspect, which is combinable with any one of the previous aspects, the support members may have a point-like contact surface. This has the effect that a contact area between the actuation ring and the orifice elements is reduced.

In another aspect, which is combinable with any one of the previous aspects, the support members comprise protrusions on the actuation ring and/or the plurality of orifice elements.

In another aspect, which is combinable with any one of the previous aspects, the support members may be adapted in size, shape, surface structure, local arrangement and/or material to minimize friction between the support members and the actuation ring and/or between the support members and the plurality of orifice elements. Thereby, a contact surface of the support member, as described above, may be independent of the shape. In total, these advantageous features may lead to an improved interaction of actuation ring and orifice elements regarding reduced friction and furthermore, may improve the overall efficiency regarding weight of the system, reduction of moved masses and stability.

In another aspect, which is combinable with any one of the previous aspects, the plurality of support members comprises at least 3 support members. This may ensure the stability of the adjustment mechanism and may increase the reliability of the system. For instance, by having at least 3 support members, a tilting of the actuation ring against a radial plane in which the orifice elements are arranged may be prevented, similar to a tripod. Preferably, the number of support members equals the number of orifice elements. While being arranged axially between the actuation ring and the orifice elements the support members may, additionally or alternatively, be distributed equally spaced in a circumferential direction of the actuation ring. This feature ensures the axial support of each orifice element and an equal distribution of the axial force in the circumferential direction. In other words, assigning to each orifice element one support member for axially mounting it against the actuation ring improves the stability of the whole adjustment mechanism and ensures an equal distribution of friction forces. Especially, in embodiments with a spring, the friction force induced by the axial preload may be distributed equally.

In another very advantageous aspect, which is combinable with any one of the previous aspects, the support members may be located close to or substantially at a radial inner circumference of the actuation ring. This has the effect that a radius between the rotation axis of the actuation ring and the contact point of a support member is minimized. As a consequence, the arc length corresponding to the travelling distance of the contact point of a support member caused by rotation of the actuation ring is also minimized. That means the closer the support member is arranged to the center of the ring (rotation axis), the smaller is the resulting arc length, and thus the less is the friction in that area.

In another aspect, which is combinable with any one of the previous aspects, the support members may be located close to or substantially at respective pivot axes of the orifice elements. This feature helps to further reduce the above mentioned relative movement and friction.

In another aspect, which is combinable with any one of the previous aspects, each of the orifice elements may comprise a shaft. The shaft may be adapted such that each orifice element is rotatably supported via its respective shaft in a compressor housing.

The present invention further relates to a compressor for a charging device. The compressor comprises a compressor housing which defines a compressor inlet and a compressor wheel which is arranged in the compressor housing. The compressor further comprises an adjustment mechanism according to any one of the previous embodiments and aspects. The adjustment mechanism is thereby arranged in the compressor inlet.

In one aspect of the compressor, the adjustment mechanism is axially mounted between the compressor housing and an inlet cover of the compressor housing, the inlet cover being arranged axially opposite to the orifice elements relative to the actuation ring.

In another aspect of the compressor, which is combinable with any one of the previous aspects, the orifice elements may be rotatably supported in the inlet cover. Alternatively, the orifice elements are rotatably supported directly in the compressor housing.

DETAILED DESCRIPTION

In the context of this invention, the expressions axially, axial or axial direction is meant to be a direction parallel of or along an axis of the actuation ring. When the adjustment mechanism is mounted in a compressor housing, the axial direction also substantially coincides with an axis of the compressor, i.e. with a rotation axis of the compressor wheel. Thus, with reference to the figures, see, especially FIG. 1, an axial dimension is described with reference sign 52, a radial dimension extending "radially" away from the axial dimension 52 is described with reference sign 56. Furthermore, a circumferential dimension around the axial dimension 52 is described with reference sign 54.

Figure 1:
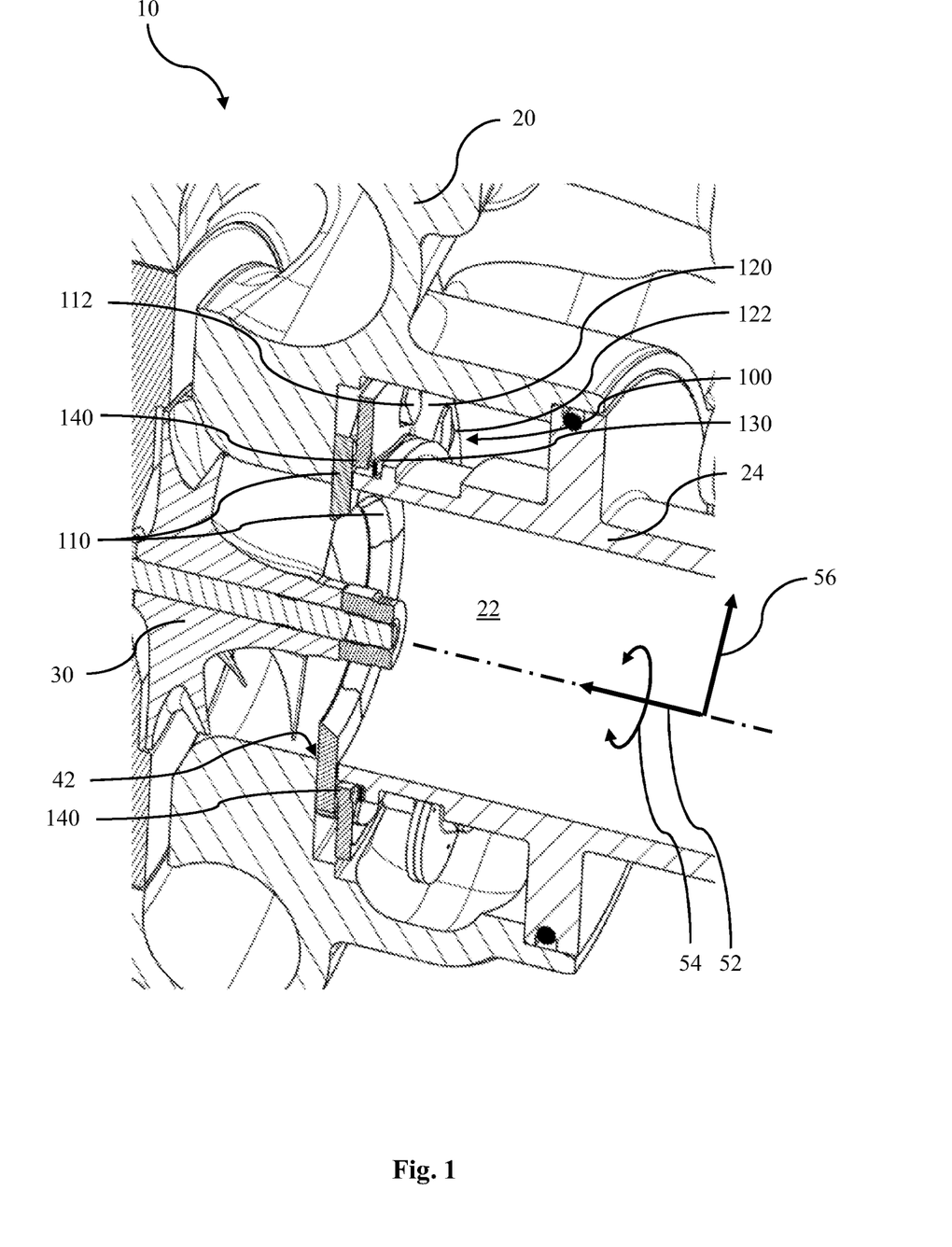
FIG. 1 shows a sectional view of an adjustment mechanism according to a first embodiment of the invention mounted in a compressor housing.

FIG. 1 illustrates an exemplary embodiment of an adjustment mechanism 100 for variably adjusting the cross-section of a compressor inlet 22 according to the present invention. Although, the inventive adjustment mechanism 100 may be an independent module FIG. 1 shows, for illustrative purposes, the adjustment mechanism 100 mounted in a compressor 10 in a cross-sectional view.

The adjustment mechanism 100 comprises a plurality of rotatable orifice elements 110 and an actuation ring 120. The actuation ring 120 is mechanically coupled to the plurality of orifice elements 110 such that rotation of the actuation ring 120 causes movement of the orifice elements 110. The movement of the orifice elements 110 thereby adjusts the cross-section of a compressor inlet 22. The adjustment mechanism 100 further comprises a plurality of support members 140 which are arranged axially between the plurality of orifice elements 110 and the actuation ring 120. Additionally, the adjustment mechanism 100 comprises a spring 130, more specific a ring-shaped wave spring. The spring 130 is adapted to axially preload the plurality of orifice elements 110 and the actuation ring 120 when being in a mounted state. In the embodiment of FIG. 1, the adjustment mechanism 100 is mounted in the compressor inlet between a compressor housing 20 and an inlet cover 24 of the compressor housing 20. In other embodiments the adjustment mechanism 100 may comprise more than one spring and/or other springs than a ring-shaped wave spring, different types and configurations of springs are within the scope of the invention. Only to name a few alternatives, a plurality of coil springs, a coil spring or similar mechanisms which exert an axial preload on the plurality of orifice elements 110 and/or the actuation ring 120 may be used. If a plurality of coil springs is used, the plurality of springs may, for instance, be distributed circumferentially on the actuation ring and arranged axially between the actuation ring and the orifice elements. In other embodiments the adjustment mechanism 100 may only comprise either one or more springs 130 or a plurality of support members 140.

By adjusting the cross-section of a compressor inlet 22, the possibility of adapting the cross-section according to different operating conditions is established. This may lead to an enhanced, respectively enlarged compressor map as the surge line is moved to the left, i.e. towards smaller flow rates. Furthermore, the arrangement of support members 140 axially between the plurality of orifice elements 110 and the actuation ring 120, establishes the option of axially bearing the plurality of orifice elements 110 and the actuation ring 120 against each other via contacts through said support members 140. This may lead to several advantageous effects, such as less movement of the plurality of orifice elements 110 and the actuation ring 120 and less relative movement between each other. During operation in a mounted state in the compressor housing 20 this may advantageously result in less vibration, and thereby in less wear and noise development. Additionally, dimensions of the actuation ring 120, especially the outer diameter of the actuation ring 120 can be reduced compared to an actuation ring 120 of an adjustment mechanism without such inventive support members. That is because a bearing of the actuation ring 120 in a compressor housing 20 in a radial outer region can be omitted due to the possibility of bearing the actuation ring 120 against the plurality of orifice elements 110. In turn this may lead to a size reduced compressor housing 20 and a lighter design, all in all improving the efficiency of the compressor 10 and the ICE, respectively. Also wear between the orifice elements 110 and the actuation ring 120 may be reduced in comparison to an adjustment mechanism without said inventive support members. That may be accomplished by the orifice elements 110 and the actuation ring 120 being axially in contact with each other only via the support members 140 and not via their full surfaces facing each other.

The adjustment mechanism 100 comprising one or more springs 130 may further reduce unwanted movement of the plurality of orifice elements 110 and/or the actuation ring 120, whilst still allowing the adjustment mechanism 100 to be actuated. That is because the axial preload exerted on the plurality of orifice elements 110 and/or the actuation ring 120 mainly acts in an axial direction 52, whereas a rotation of the actuation ring 120 and a corresponding movement of the orifice elements 110 is still ensured. Thereby, especially rattle noise of the orifice elements 110 may be reduced. In total, during operation when mounted in a compressor housing 20, this advantageously may lead to less noise, vibration and harshness (NVH) of the adjustment mechanism 100. Furthermore, implementing an inventive spring 130 may ensure a close contact axially between the adjustment mechanism 100, especially the orifice elements 110, and a compressor housing 20 when mounted in that compressor housing 20. This may help to seal said axial area between the adjustment mechanism 100 and the compressor housing 20 and consequently may help to avoid pollution in the adjustment mechanism 100. For instance, axial gap 42 between compressor housing 20 and orifice elements 110 may be reduced or eliminated by the axial preload of the one or more springs 130 in the axial direction of arrow 52. In total, this may result in higher efficiencies of the system.

As shown in FIG. 1, the spring 130 is arranged axially between the actuation ring 120 and a surface of the inlet cover 24. Thereby, the spring 130 can apply an axial force via the actuation ring 120 on the plurality of orifice elements 110. In other embodiments, the one or more springs 130 may be arranged elsewhere between the actuation ring 120 and the compressor housing 20. In further embodiments, the one or more springs 130 may be arranged axially between the plurality of orifice elements 110 and the actuation ring 120. In further embodiments, the one or more springs 130 may be arranged axially between the plurality of orifice elements 110 and the compressor housing 20, preferably a surface of the compressor housing 20 facing in an axial direction 52 towards the plurality of orifice elements 110.

As described above, the spring 130 is adapted to ensure that at least the first axial gap 42 between the orifice elements 110 and the compressor housing 20 is minimized in a mounted state. This may be accomplished by, for instance, accurately setting the spring force of the spring 130 and/or setting the preload which is exerted by the spring 130 on the orifice elements 110. Setting the preload may also depend on the counter bearing of the spring 130, which is, in the present exemplary case, the inlet cover 24. Furthermore, this advantageous aspect may result in an avoidance of vibration. Additionally, this aspect may prevent, i.e. substantially prevent, particles to enter and pollute the adjustment mechanism 100 from a compressor inlet 22 side, i.e. enter the adjustment mechanism 100 in a radial direction 56. At the same time, the spring 130 allows for thermal expansion and movability of movable parts, i.e. orifice elements 110 and actuation ring 120. This, again, may result in a less error-prone adjustment mechanism 100 and may enhance the efficiency of a compressor using such an adjustment mechanism 100.

In the exemplary embodiment shown in reference with the figures, the support members 140 are configured to axially support the actuation ring 120 against the plurality of orifice elements 110. By axially supporting the actuation ring 120 against the plurality of orifice elements 110, actuation ring 120 and orifice elements 110 axially contact each other only via said support members 140. As set forth above, this advantageously may lead to less movement and thereby to less vibration, wear and noise development. At least, it may prevent a full contact between the orifice elements 110 and the actuation ring 120 which significantly reduces possible contact surfaces between the orifice elements 110 and the actuation ring 120 and thereby leads to a reduced friction area between these two elements. "full contact" is to be understood as a state, in that the orifice elements 110 and the actuation ring 120 are axially in contact with each other via their full respective surfaces facing each other. This may be prevented by the support members 140 as the orifice elements 110 and the actuation ring 120 are axially in contact with each other only via the support members 140, thus a reduced contact area. This obviously may further be driven by the design and properties of the support members 140 which will be discussed below in the description.

Figure 2:
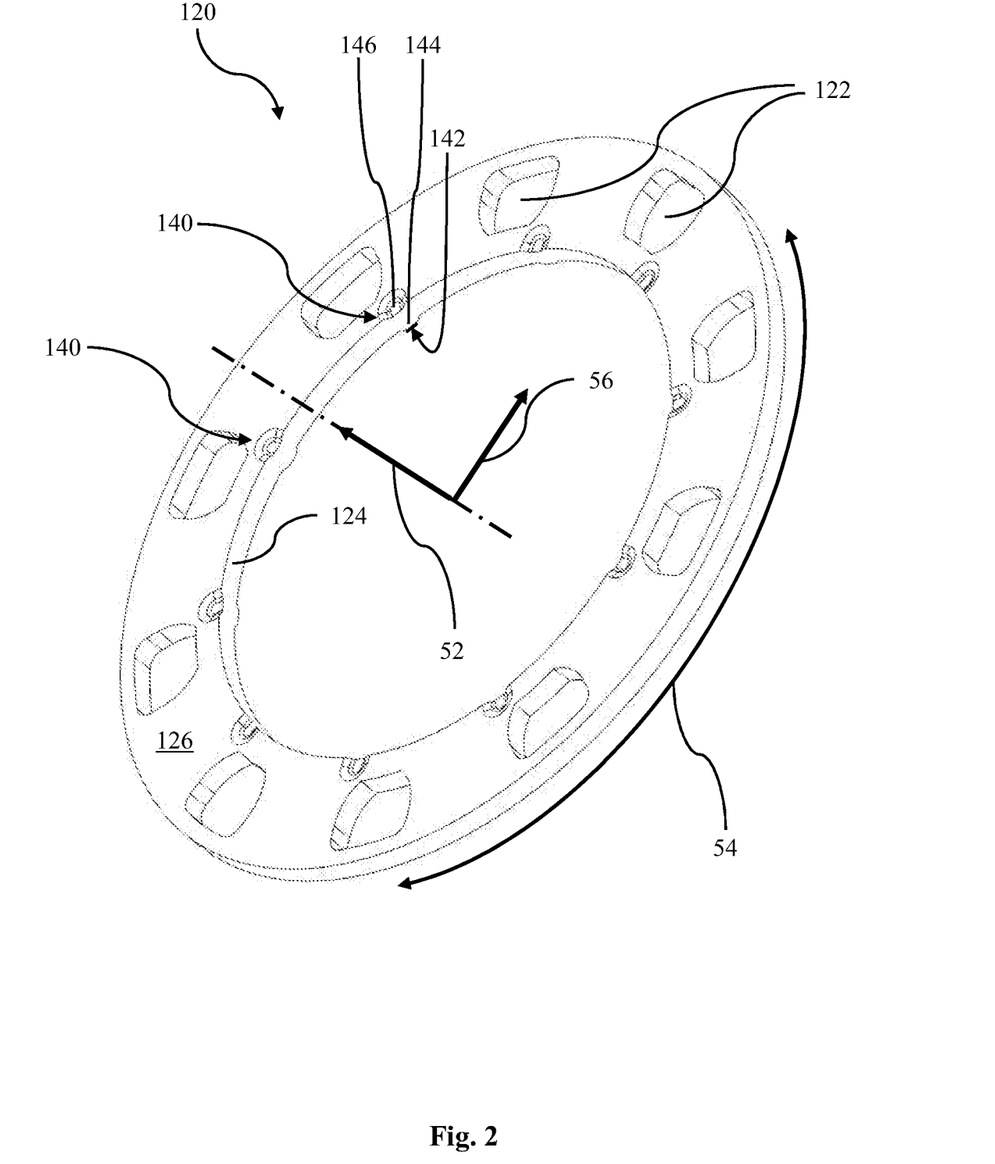
FIG. 2 shows an isometric view of the actuation ring including support members according to a first embodiment.

FIG. 2 shows an isometric view of the exemplary embodiment of the inventive actuation ring 120. The support members 140 are thereby integrally formed with the actuation ring 120. Thus, the support members 140 are part of the actuation ring 120. The support members each comprises a protrusion 144 extending from the actuation ring 120 in an axial direction 52 towards the orifice elements 110 (see also FIG. 1) and a corresponding recess 146 on an axially opposite side of the actuation ring 120. Each support member has a point-like contact surface 142.

In other embodiments, the support members 140 may only be attached to the actuation ring 120. In other embodiments, the support members 140 may be attached to or integrally formed with the orifice elements 110 (not shown). If a support member 140 is part of the respective orifice 110 element, it extends in an axial direction 52 towards the actuation ring 120. In other words, this means that all support members may be either attached to the actuation ring 120 or to the orifice elements 110. Another possible configuration may be that at least one of the support members 140 is attached to the actuation ring 120 and the rest of the support members 140 is attached to the orifice elements 110 or vice versa. For instance, half of the total number of support members 140 may be attached to the actuation ring 120 and the rest of the support members 140 may be attached to the orifice elements 110. It is self-explanatory that, regarding the latter explanations, the support members 140 may also be integrally formed with the respective parts (actuation ring 120 and orifice elements 110 respectively) instead of only being attached to them. In alternative embodiments, wherein the support members 140 are neither attached to or integrally formed with either the actuation ring 120 or the orifice elements 110, the support members 140 may act as separate parts axially between and interact with the actuation ring 120 and the orifice elements 110. In the latter alternative embodiment, the actuation ring 120 and the orifice elements 110 may be correspondingly configured to mechanically interact with the support members 140, for instance, by each comprising recesses with which the support members 140 may interact (not shown).

The point-like contact surface 142 has the effect that a contact area between the actuation ring 120 and the orifice elements 110 is reduced as they only contact each other via the support members 140 instead of via a ring surface 126 of the actuation ring 120 which faces in an axial direction 52 towards the orifice elements 110. As the contact surface 142 of the support members 140 have a point-like shape, the total contact surface between actuation ring 120 and the orifice elements 110 is maximally as large as the sum of contact surfaces 142, i.e. the sum of point-like contact surfaces 142 of all support members 140. Also other shapes that points may be used as contact surface 142, such as oval-like, line-like circle-like.

The support members 140 comprising protrusions 144 and recesses 146 may have, for instance, a weight reducing effect in comparison to a support member 140 being configured as an additional part. Furthermore, such support members 140 may be time and cost efficiently integratable into the respective part, e.g. the actuation ring 120. In other embodiments, the support members 140 may only comprise a protrusion 144 without a corresponding recess. In other embodiments, the support members 140 may comprise a wave like-shape. That means the actuation ring 120 may comprise several waves along a circumferential direction 54, wherein each wave which extends in the axial direction 52 towards the orifice elements 110 represents a support member 140. In alternative embodiments, the support members 140 comprise protrusions 144 and/or corresponding recesses 146 on the plurality of orifice elements 110. Thereby, the just described properties of the support members 140 also apply. In other words, this means that the support members 140 may be designed as protrusions 144 which extend from the actuation ring 120 in an axial direction 52 towards the orifice elements 110 or that the support members 140 may be designed as protrusions 144 which extend from a respective orifice element 110 in an axial direction towards the actuation ring 120. There are also embodiments, wherein at least one of the support members 140 may be designed as protrusion 144 which extend from the actuation ring 120, and wherein the rest of the support members 140 may be designed as protrusion 144 which extend from a respective orifice element 110. Thereby, if a support member 140 is integrally formed with or attached to the actuation ring 120, it extends in an axial direction 52 towards the respective orifice element 110. If a support member 140 is integrally formed with or attached to the respective orifice element 110, it extends in an axial direction 52 towards the actuation ring 120.

Although, the support members 140 are only shown as "bumps" in the figures, thus, having a protrusion 144, a recess 146 and a cone-like structure, in other embodiments they may comprise a different shape. For instance, the support members 140 may be adapted in size, shape, surface structure, local arrangement and/or material to minimize friction between the support members 140 and the actuation ring 120 and/or between the support members 140 and the plurality of orifice elements 110 (not shown). Just to name a few beneath the cone-like structure, a support member 140 can be realized as a rod-like structure, a hollow cylinder-shaped structure or a wall-shaped structure. Thereby, the contact surface 142 of the support member 140, as described above, may be independent of the shape. Preferably, the contact surface 142 does correspond to the shape of the support member 140, e.g. a rod-like support member 140 may have a point-like contact surface 142 and a hollow cylinder-shaped structure may have a circle-like contact surface 142. The support members 140, especially, their contact surface 142 (contact area) may comprise a specific surface structure, for instance a friction-reducing structure. Additionally or alternatively, a support member 140 may comprise a specific material, such as a polymer. Additionally or alternatively, a support member 140 may comprise the same material as the actuation ring 120 and/or the orifice elements 110. In total, these advantageous features may lead to an improved interaction of actuation ring 120 and orifice elements 110 regarding reduced friction and furthermore, may improve the overall efficiency regarding weight of the system, reduction of moved masses and stability.

The exemplary adjustment mechanism 100 of the figures comprises ten support members 140 (see, e.g., FIG. 2). Thereby, the number of support members 140 equals the number of orifice elements 110. The exemplary embodiment does not only show the support members 140 being arranged axially between the actuation ring 120 and the orifice elements 110 (see, e.g., FIG. 1), but also shows the support members 140 being distributed equally spaced in a circumferential direction 54 of the actuation ring 120 (see, e.g., FIG. 2). This ensures the axial support of each orifice element 110 and an equal distribution of the axial force in the circumferential direction 54. In other words, assigning to each orifice element 110 one support member 140 for axially bearing it against the actuation ring 120 improves the stability of the whole adjustment mechanism 100 and ensures an equal distribution of friction forces. Especially, in embodiments with a spring 130, the friction force induced by the axial preload may be distributed equally. In other embodiments, wherein the number of orifice elements 110 may be more or less than ten, also the number of support members 140 may be adapted to the number of orifice elements 110. In any embodiment an adjustment mechanism according to the invention comprises at least three support members 140. This may ensure the stability of the adjustment mechanism 100 and increase the reliability of the system. For instance, by having at least three support members 140 tilting of the actuation ring 120 against a radial plane in which the orifice elements 100 are arranged may be prevented, similar to a tripod.

Figure 3:
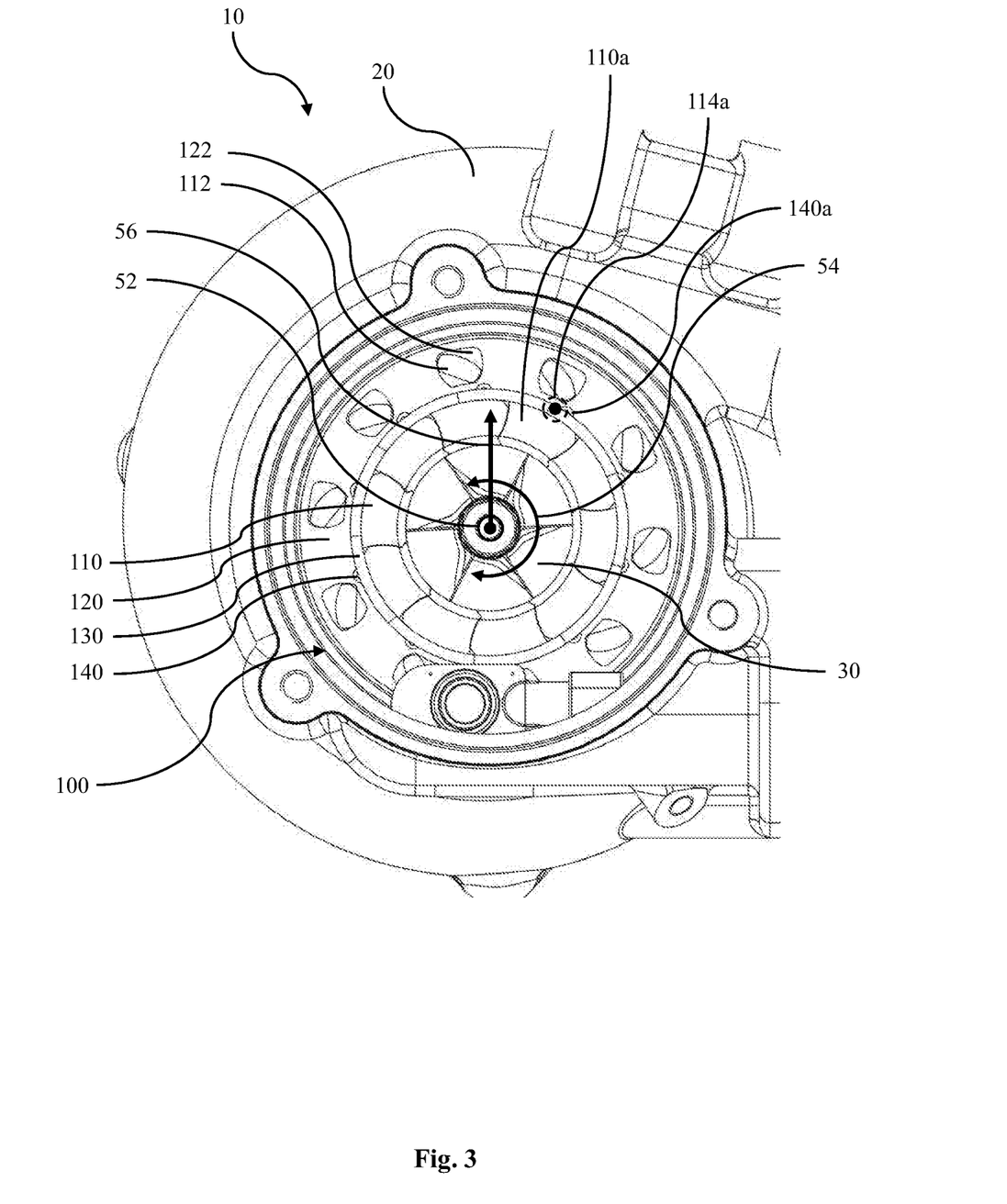
FIG. 3 shows a plan view of the adjustment mechanism according to the first embodiment mounted in a compressor housing but without an inlet cover.

FIG. 3 shows a plan view of the exemplary adjustment mechanism 100 mounted in the compressor housing 22 but without an inlet cover 24. As can be seen from this figure, the support members 140 are located close to or substantially at a radial inner circumference 124 (see also FIG. 2) of the actuation ring 120. This has the effect that a distance in the radial direction 56 from the rotation axis 52 of the actuation ring 120 to a support member 140 and, thus, to a contact surface 142 with the respective orifice element 110 is minimized. As a consequence, an arc length corresponding to the travelling distance of the contact surface 142 of a support member 140 caused by rotation of the actuation ring 120 is also minimized. That means the closer the support member 140 is arranged to the center of the actuation ring 120 (rotation axis 52), the smaller is the resulting arc length. In the exemplary embodiment of FIG. 3, said reduced arc length (travelling distance) means that an amount of relative movement between the support members 140 and the orifice elements 110 and thereby an amount of friction on the orifice elements 110 and/or on the support members 140 may be reduced. Regarding the above described contact surface 142 of the support members 140 in the light of this feature, the contact surface 142 is to be configured small, e.g. point-like to reduce the friction area caused by the relative movement between the support members 140 and the orifice elements 110.

Figure 4:
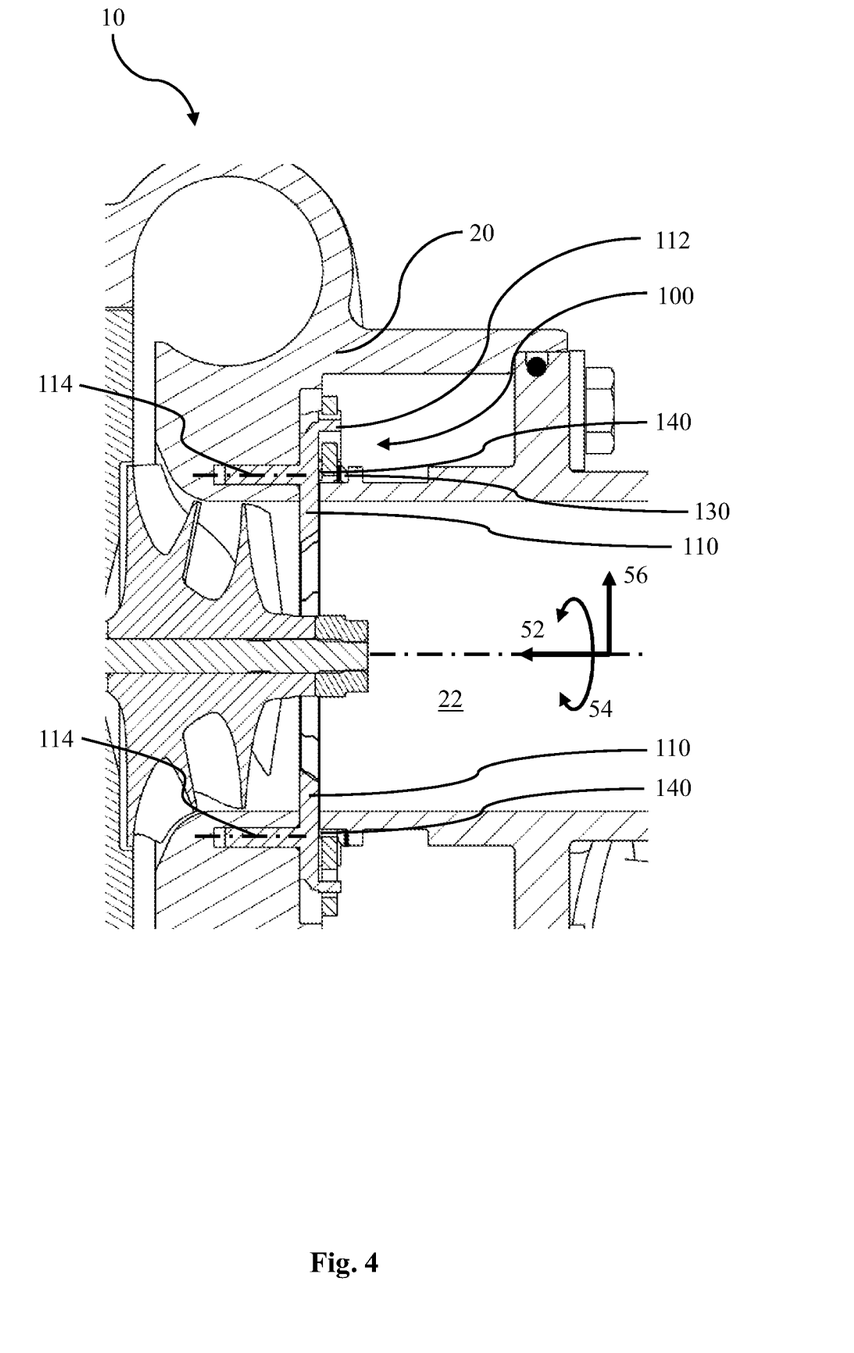
FIG. 4 shows a sectional view of the adjustment mechanism according to the first embodiment mounted in a compressor housing but without an inlet cover.

FIG. 4 shows a sectional view of the exemplary adjustment mechanism 100 mounted in a compressor housing 20 but without an inlet cover 24. The section shows exemplary for two orifice elements 110 that each orifice element 110 comprises a shaft 116. The shaft 116 is adapted such that each orifice element 110 is rotatably supported via its respective shaft 116 in the compressor housing 20. Furthermore, FIG. 4 shows pivot axes 114 of the orifice elements 110 around which they are rotatable. It can be seen, that the support members 140 are located close to or substantially at the respective pivot axes 114 of the orifice elements 110. Depending on an opening degree of the adjustment mechanism 100 each support member 140 is closer or further away from the respective pivot axis 114. That is because, with respect to the compressor housing 20, the pivot axis does not move relatively, but the support member 140 does as the actuation ring 120 is rotated. For illustrative purposes, FIG. 3 schematically shows the pivot axis 114a of orifice element 110a. Furthermore, FIG. 3 shows support member 140a which supports orifice element 140a and actuation ring 120 against each other. The adjustment mechanism 100 is shown in a closed position and the support member 140a is positioned close to the pivot axis 114a, positioned slightly offset the pivot axis 114a clockwise in a circumferential direction 54. When the adjustment mechanism 100 is actuated to the opened position, the actuation ring is rotated counter-clockwise. Thus, in comparison to FIG. 3, the support member 140a is also moved counter-clockwise, and may be, at a fully opened position of the adjustment mechanism 100, positioned slightly offset the pivot axis 114a counter-clockwise in a circumferential direction 54. This accounts in a similar way for all the other support members 140. Thus, the support members 140 always stay located close to or substantially at the respective pivot axes 114. This also depends on the opening degree of the adjustment mechanism. An advantage of this feature is to further reduce the above mentioned relative movement and thereby the friction.

In the exemplary embodiment, each of the orifice elements 110 comprises a coupling element 112 (see, e.g., FIGS. 1-3) extending from the respective orifice element 110 in an axial direction 52 towards the actuation ring 120. The coupling elements 112 may be configured to mechanically couple with corresponding recesses 122 (see, especially FIGS. 2-3) in the actuation ring 120. In the exemplary embodiment, the recesses 122 are configured as through holes.

In other embodiments, the recesses 122 may be configured as cavities. A cavity is to be understood as a feature which is axially restricted, i.e. comprises a bottom in an axial direction. In some embodiments, wherein the recesses 122 are configured as cavities, the support members 140 may be arranged on the respective coupling elements 112 to axially support the actuation ring 120 against the plurality of orifice elements 110 in an area of the cavity. Thereby, the support members 140 may be integrally formed with the respective coupling elements 112 to axially support the actuation ring 120 against the plurality of orifice elements 110 in an area of the cavity. In other embodiments, the support members 140 may be arranged in the cavities. In another embodiment with coupling elements 112, the coupling elements 112 may be part of the actuation ring 120 and may be configured to mechanically couple with corresponding recesses 122 in the orifice elements 110. That means the coupling elements 112 may extend from the actuation ring 120 in an axial direction 52 towards the respective orifice elements 110. Each orifice element 110 may therefore comprise a respective recess 122 (through hole or cavity). The number of coupling elements 112 may thereby coincide with the number of orifice elements 110 such that each coupling element 112 may mechanically couple with one specific orifice element 110. Further features, for instance, the arrangement of the support members 140, can be applied analogously to this embodiment of the inventive adjustment mechanism 100 with coupling elements 112.

With reference to FIGS. 1, 3-4, the present invention further relates to a compressor 10 for a charging device. The compressor 10 comprises a compressor housing 20 which defines a compressor inlet 22 and a compressor wheel 30 which is arranged in the compressor housing 20. The compressor 10 further comprises an adjustment mechanism 100 according to any one of the previously described embodiments and aspects. The adjustment mechanism 100 is thereby arranged in the compressor inlet 22.

As depicted in FIG. 1, the adjustment mechanism 100 is axially mounted between the compressor housing 20 and an inlet cover 24 of the compressor housing 20. The inlet cover 24 is thereby arranged axially opposite to the orifice elements 110 relative to the actuation ring 120. In other words, this means that the inlet cover 24 is arranged "upstream" of the adjustment mechanism 100. In this context "upstream" refers to a side/direction against flow direction of air in the flow path through the compressor 10, wherein "downstream" refers to a side/direction within flow direction of air in the flow path through the compressor 10. The orifice elements 110 are rotatably supported directly in the compressor housing 20 (see, e.g., FIG. 4).

In other embodiments, the orifice elements 110 may be rotatably supported in the inlet cover 24.

LIST OF REFERENCE SIGNS

| | |
|---|---|
| 10 | compressor |
| 20 | compressor housing |
| 22 | compressor inlet |
| 24 | inlet cover |
| 30 | compressor wheel |
| 42 | first axial gap |
| 52 | axial direction |
| 54 | circumferential direction |
| 56 | radial direction |
| 100 | adjustment mechanism |
| 110 | orifice element |
| 112 | coupling element |
| 114 | pivot axes |
| 116 | shaft |
| 120 | actuation ring |
| 122 | recess |
| 124 | radial inner circumference |
| 126 | ring surface |
| 130 | spring |
| 140 | support member |
| 142 | contact surface |
| 144 | protrusion |
| 146 | recess |

It should be understood that the present invention can also (alternatively) be defined in accordance with the following embodiments:

1. An adjustment mechanism (100) for variably adjusting the cross-section of a compressor inlet (22) comprising:
    a plurality of rotatable orifice elements (110), and
    an actuation ring (120) mechanically coupled to the plurality of orifice elements (110) such that rotation of the actuation ring (120) causes movement of the orifice elements (110) to adjust the cross-section of a compressor inlet (22);
    characterized by
    a plurality of support members (140) arranged axially between the plurality of orifice elements (110) and the actuation ring (120).
2. An adjustment mechanism (100) for variably adjusting the cross-section of a compressor inlet (22) comprising:
    a plurality of rotatable orifice elements (110), and
    an actuation ring (120) mechanically coupled to the plurality of orifice elements (110) such that rotation of the actuation ring (120) causes movement of the orifice elements (110) to adjust the cross-section of a compressor inlet (22);
    characterized by
    one or more springs (130), preferably a ring-shaped wave spring, adapted to axially preload the plurality of orifice elements (110) and/or the actuation ring (120) in a mounted state in a compressor housing (20).
3. The adjustment mechanism (100) of embodiment 2 further comprising a plurality of support members (140) arranged axially between the plurality of orifice elements (110) and the actuation ring (120).
4. The adjustment mechanism (100) of any one of embodiments 2 to 3, wherein the one or more springs (130) are arranged axially between the plurality of orifice elements (110) and the actuation ring (120).
5. The adjustment mechanism (100) of any one of embodiments 2 to 4, wherein the one or more springs (130) are arranged axially between the actuation ring (120) and a surface of a compressor housing (20) to apply an axial force via the actuation ring (120) on the plurality of orifice elements (110).
6. The adjustment mechanism (100) of any one of embodiments 2 to 3, wherein the one or more springs (130) are arranged axially between the plurality of orifice elements (110) and a surface of a compressor housing (20).
7. The adjustment mechanism (100) of any one of embodiments 2 to 6, wherein the one or more springs (130) are adapted to ensure that at least a first axial gap (42) between the orifice elements (110) and a compressor housing (20) axially opposite of the one or more springs (130) is minimized in a mounted state.
8. The adjustment mechanism (100) of any one of embodiments 1 or 3 to 7, wherein the support members (140) are configured to axially support the actuation ring (120) against the plurality of orifice elements (110).
9. The adjustment mechanism (100) of any one of embodiments 1 or 3 to 8, wherein the support members (140) are attached to the actuation ring (120), optionally wherein the support members (140) are integrally formed with the actuation ring (120).
10. The adjustment mechanism (100) of any one of embodiments 1 or 3 to 9, wherein the support members (140) are attached to the orifice elements (110), optionally wherein the support members (140) are integrally formed with the orifice elements (110).
11. The adjustment mechanism (100) of any one of embodiments 1 or 3 to 10, wherein each of the orifice elements (110) comprises a coupling element (112) extending from the respective orifice element (110) in an axial direction towards the actuation ring (120), wherein the coupling elements (112) are configured to mechanically couple with corresponding recesses (122) in the actuation ring (120).
12. The adjustment mechanism (100) of embodiment 11, wherein the recesses (122) are cavities, wherein the support members (140) are arranged on the respective coupling elements (112) to axially support the actuation ring (120) against the plurality of orifice elements (110) in an area of the cavity and optionally wherein the support members (140) are integrally formed with the respective coupling elements (112) to axially support the actuation ring (120) against the plurality of orifice elements (110) in an area of the cavity.
13. The adjustment mechanism (100) of embodiment 11, wherein the recesses (122) are through holes.
14. The adjustment mechanism (100) of any one of embodiments 1 or 3 to 13, wherein the support members (140) have a point-like contact surface (142).
15. The adjustment mechanism (100) of any one of embodiments 1 or 3 to 14, wherein the support members (140) comprise protrusions on the actuation ring (120) and/or the plurality of orifice elements (110).
16. The adjustment mechanism (100) of any one of embodiments 1 or 3 to 15, wherein the support members (140) are adapted in size, shape, surface structure, local arrangement and/or material to minimize friction between the support members (140) and the actuation ring (120) and/or between the support members (140) and the plurality of orifice elements (110).
17. The adjustment mechanism (100) of any one of embodiments 1 or 3 to 16, wherein the plurality of support members (140) comprises at least 3 support members (140), preferably wherein the number of support members (140) equals the number of orifice elements (110).
18. The adjustment mechanism (100) of any one of embodiments 1 or 3 to 17, wherein the support members (140) are distributed equally spaced in a circumferential direction (54) of the actuation ring (120).

19. The adjustment mechanism (100) of any one of embodiments 1 or 3 to 18, wherein the support members (140) are located close to or substantially at a radial inner circumference (124) of the actuation ring (120).
20. The adjustment mechanism (100) of any one of embodiments 1 or 3 to 19, wherein the support members (140) are located close to or substantially at respective pivot axes (114) of the orifice elements (110).
21. The adjustment mechanism (100) of any one of embodiments 1 or 3 to 20, wherein each of the orifice elements (110) comprises a shaft (116) adapted to be rotatably supported in a compressor housing (20).
22. A compressor (10) for a charging device, comprising:
    a compressor housing (20) defining a compressor inlet (22), and
    a compressor wheel (30) arranged in the compressor housing (20);
    characterized by
    an adjustment mechanism (100) according to any one of the preceding embodiments, wherein the adjustment mechanism (100) is arranged in the compressor inlet (22).
23. The compressor (10) of embodiment 22, wherein the adjustment mechanism (100) is axially mounted between the compressor housing (20) and an inlet cover (24) of the compressor housing (20), the inlet cover (24) being arranged axially opposite of the orifice elements (110) relative to the actuation ring (120).
24. The compressor of embodiment 23, wherein the orifice elements (110) are rotatably supported in the inlet cover (24).
25. The compressor of any one of embodiments 22 or 23, wherein the orifice elements (110) are rotatably supported directly in the compressor housing (20).

The invention claimed is:

1. An adjustment mechanism (100) comprising:
    a plurality of orifice elements (110), wherein each of the plurality of orifice element (110) comprises a plate-shaped body and
    a rotatable actuation ring (120) mechanically coupled to the plurality of orifice elements (110);
    characterized by
    a plurality of support members (140), each having a protrusion (144), a point-like or oval-like contact surface (142), and a recess (146), arranged axially between the plurality of orifice elements (110) and the actuation ring (120), wherein each of the plurality of support members (140) is in the shape of a cone, or bump and wherein the plurality of support members (140) are integrally formed with the actuation ring (120) and wherein each of the orifice elements (110) comprises a shaft (116) adapted to be supported in a compressor housing (20) and wherein each of the plurality of support members (140) are designed as protrusions (144) which extend from the actuation ring (120) in an axial direction towards the plurality of orifice elements (110).
2. The adjustment mechanism (100) of claim 1, wherein the support members (140) are configured to axially support the actuation ring (120) against the plurality of orifice elements (110).
3. The adjustment mechanism (100) of claim 1, wherein the support members (140) are adapted in size, local arrangement and/or material to minimize friction between the support members (140) and the plurality of orifice elements (110).
4. The adjustment mechanism (100) of claim 1, wherein the plurality of support members (140) comprises at least 3 support members (140).
5. The adjustment mechanism (100) of claim 4, wherein the number of support members (140) equals the number of orifice elements (110).
6. The adjustment mechanism (100) of claim 1, wherein the support members (140) are distributed equally spaced in a circumferential direction (54) of the actuation ring (120).
7. The adjustment mechanism (100) of claim 1, wherein the support members (140) are located close to a radial inner circumference (124) of the actuation ring (120).
8. The adjustment mechanism (100) of claim 1, wherein the support members (140) are located close to respective pivot axes (114) of the orifice elements (110).
9. A compressor (10) for a charging device, comprising:
    a compressor housing (20) defining a compressor inlet (22), and
    a compressor wheel (30) arranged in the compressor housing (20);
    characterized by
    an adjustment mechanism (100) according to claim 1, wherein the adjustment mechanism (100) is arranged in the compressor inlet (22).
10. The compressor (10) of claim 9, wherein the adjustment mechanism (100) is axially mounted between the compressor housing (20) and an inlet cover (24) of the compressor housing (20), the inlet cover (24) being arranged axially opposite of the orifice elements (110) relative to the actuation ring (120).
11. An adjustment mechanism (100) comprising:
    a plurality of orifice elements (110), wherein each of the plurality of orifice element (110) comprises a plate-shaped body and
    a rotatable actuation ring (120) mechanically coupled to the plurality of orifice elements (110);
    characterized by
    one or more springs (130) adapted to axially preload the plurality of orifice elements (110) and/or the actuation ring (120) in a mounted state in a compressor housing (20) and a plurality of support members (140), each having a protrusion (144), a point-like or oval-like contact surface (142), and a recess (146), arranged axially between the plurality of orifice elements (110) and the actuation ring (120), wherein each of the plurality of support members (140) is in the shape of a cone, or bump and wherein the plurality of support members (140) are integrally formed with the actuation ring (120) and wherein each of the orifice elements (110) comprises a shaft (116) adapted to be supported in a compressor housing (20) and wherein each of the plurality of support members (140) are designed as protrusions (144) which extend from the actuation ring (120) in an axial direction towards the plurality of orifice elements (110).
12. The adjustment mechanism (100) of claim 11 wherein the plurality of support members (140) are arranged axially between the plurality of orifice elements (110) and the actuation ring (120).
13. The adjustment mechanism (100) of claim 12, wherein the support members (140) are configured to axially support the actuation ring (120) against the plurality of orifice elements (110).
14. The adjustment mechanism (100) of claim 11, wherein the one or more springs (130) are arranged axially between the actuation ring (120) and a surface of a compressor housing (20) to apply an axial force via the actuation ring (120) on the plurality of orifice elements (110).

15. The adjustment mechanism (100) of claim 11, wherein said one or more springs (130) is a ring-shaped wave spring.

16. The adjustment mechanism (100) of claim 11 wherein the plurality of support members (140) are arranged axially between the plurality of orifice elements (110) and the actuation ring (120) and wherein the one or more springs (130) are arranged axially between the actuation ring (120) and a surface of a compressor housing (20) to apply an axial force via the actuation ring (120) on the plurality of orifice elements (110).

* * * * *